United States Patent [19]

Driggers

[11] Patent Number: 4,459,732

[45] Date of Patent: Jul. 17, 1984

[54] STOVE ROLLER

[76] Inventor: Robert H. Driggers, 105 Beth Dr., Greenville, S.C. 29609

[21] Appl. No.: 304,242

[22] Filed: Sep. 21, 1981

[51] Int. Cl.³ ............................................. B65G 13/12
[52] U.S. Cl. .................................. 29/426.3; 126/123; 193/35 TE
[58] Field of Search .................. 193/35 R, 35 TE; 414/390, 391, 397, 398; 126/120, 121, 123; 29/426.1, 426.3, 428, 823

[56] References Cited

U.S. PATENT DOCUMENTS

| 2,627,960 | 2/1953 | Eberle | 193/35 TE |
| 2,760,617 | 8/1956 | Bowen | 193/35 TE |
| 2,904,196 | 9/1959 | Teixeira | 193/35 R X |
| 3,370,727 | 2/1968 | Shaw | 193/35 R X |
| 3,374,878 | 3/1968 | Kornylak | 193/35 TE X |
| 4,369,959 | 1/1983 | Hornbuckle | 271/164 X |

Primary Examiner—Jeffrey V. Nase
Attorney, Agent, or Firm—Bailey & Hardaway

[57] ABSTRACT

An apparatus and process for removing a fireplace insert are described. The apparatus comprises a pair of front rails which telescope from a pair of rear rails to be inserted beneath a fireplace insert. The rear rails have support means extending from the front thereof for supporting the front of the rails upon an elevated surface and adjustable support means at the other end for aligning the rear rails with a hearth surface.

9 Claims, 3 Drawing Figures

STOVE ROLLER

BACKGROUND OF THE INVENTION

This invention relates generally to the art of conveyors and more particularly to the art of a conveyor for removing fireplace inserts from a hearth cavity.

In recent years, fireplace inserts which generally conform to the confines of a hearth cavity have come into widespread use in order to enhance the heating capabilities of conventional fireplaces. Such inserts have been quite effective for their intended use, but require significant maintenance in order to avoid the risks of fire associated with the residue and deposits emitted from such inserts and accumulated within the chimney area.

In order to properly maintenance a fireplace insert and the chimney with which it communicates, the insert must be removed from the hearth cavity after approximately 3,000 to 4,000 hours of operation. The inserts may weigh within the range of 400–800 pounds and are positioned on a raised hearth; thus representing a significant task for the individual conducting the maintenance. This task is usually performed by a professional chimney sweep.

As is apparent from the mass alone of such inserts, the process of removing the insert from a raised hearth cavity represents a task of considerable proportion. The process of reinserting after cleaning is of equal proportion since the insert fits into the hearth cavity with very close tolerances. Further complicating the process of insert removal and reinsertion is the consideration that most raised hearths have a depth which is not sufficient to retain an insert once it has been removed from the hearth cavity. Additionally while a hearth is normally constructed of sturdy materials, such as fire brick, slate or marble, such sturdiness is not sufficient for the rigors associated with the movement of a 400 to 800 pound hearth insert.

The removal of hearth inserts within the prior art has thus required the efforts of several people, and significant problems before the maintenancing thereof is completed. This amount of manpower is not consistent with the chimney sweep art wherein ordinarily a single individual is involved in the maintenancing of chimneys and the hearth inserts associated therewith.

Many specialized conveyors have existed within the prior art for solving a variety of problems. However, no such conveyor has heretofore confronted the problems associated with hearth insert removal and reinsertion.

An example of a specifically designed conveyor is disclosed in U.S. Pat. No. 3,374,879 to Kornylak which confronts the problems associated with dock side and on board vessel conveying. Disclosed therein are separated conveyors which telescope one within the other for the purpose of permitting loading and unloading of a vessel.

Another such conveying apparatus is disclosed in U.S. Pat. No. 3,887,083 to Baxter, wherein a conveyor with adjustable supports is utilized for placing a housing module upon a site foundation. A similar device is shown in U.S. Pat. No. 3,958,705 also to Baxter.

U.S. Pat. No. 3,869,031 to Coleman discloses an inclined ramp conveyor which may be leveled by positioning on bracket members.

U.S. Pat. No. 1,423,320 to Haas discloses rollers within an oven to assist in insertion and removal of articles from the oven.

Thus while many specially developed conveying devices exist within the prior art, no such device has ever been developed for or utilized for removal and reinsertion of hearth inserts from a hearth cavity.

SUMMARY OF THE INVENTION

It is thus an object of this invention to provide a novel apparatus to assist in the removal and reinsertion of a hearth insert from a hearth cavity.

It is a further object of this invention to provide a novel process whereby a single individual may remove and reinsert a hearth insert from a hearth cavity.

These as well as other objects are accomplished by an apparatus for conveying a fireplace insert out of a hearth cavity, the apparatus comprising a pair of parallel rear rails having conveying means disposed thereon, a pair of front rails telescopically disposed between the rear rails and being extendable from between the rear rails and supported by support means extending from the rear rails for resting upon an elevated surface and adjustable vertical support means attached to the other end of the rear rails. The process of this invention is carried out by leveling the rear rails and extending the front rails beneath a fireplace insert and simply conveying the insert along the conveying means so as to render the hearth cavity accessible for maintenance.

DETAILED DESCRIPTION

In accordance with this invention, it has been found that an apparatus to be herein described may be utilized by a single individual to move a hearth insert from a hearth cavity for maintenance or other purposes. The apparatus of this invention is portable and transportable by a single individual, adaptable to any hearth height, aids not only the removal of a hearth insert but also the reinsertion thereof and causes no wear and tear upon the hearth construction during the removal and reinsertion of a hearth insert. Other advantages will be apparent from the following description with reference to the various Figures of drawing.

Figure 1:
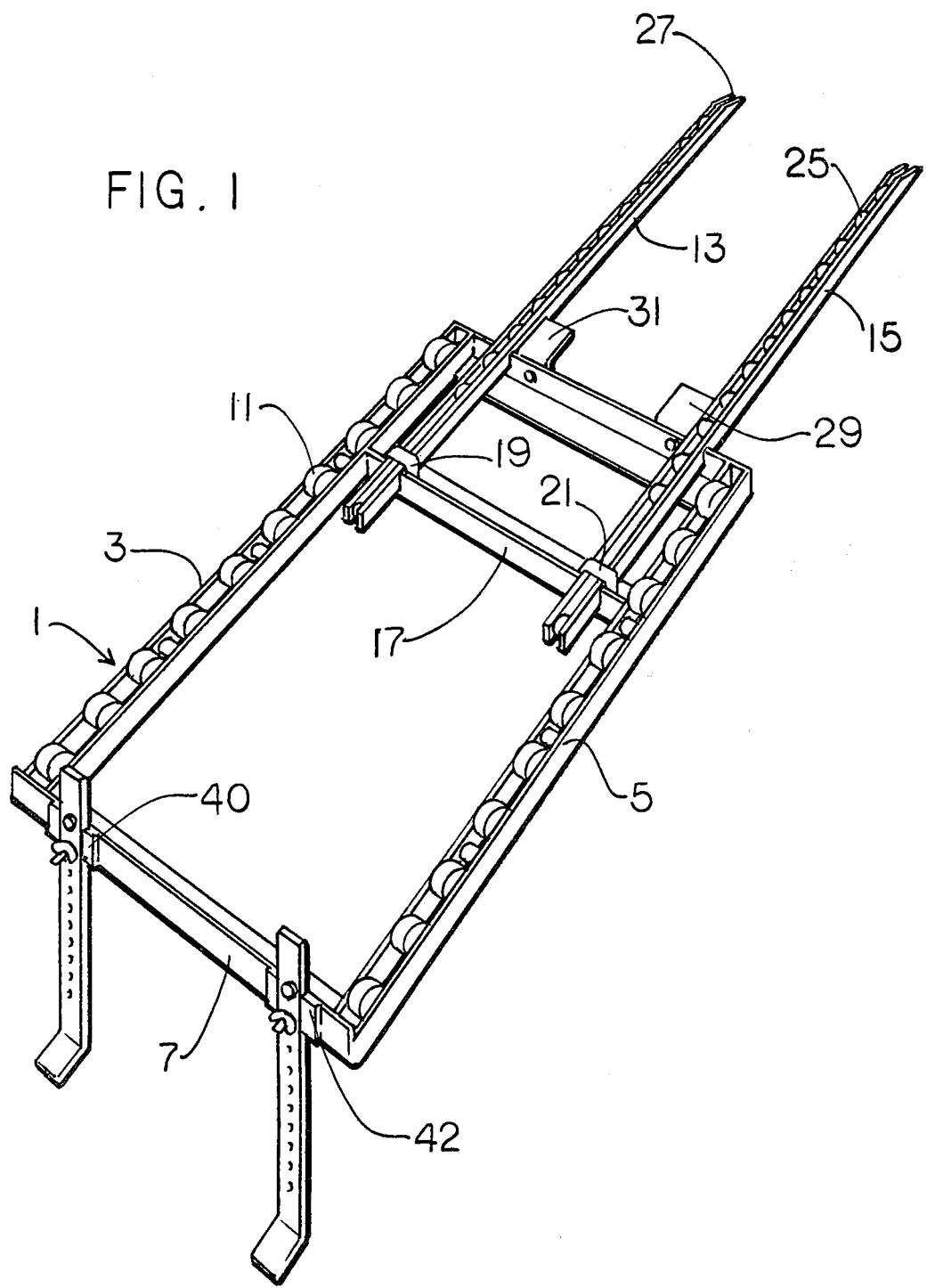
FIG. 1 of the drawings is an isometric view of the apparatus in accordance with this invention showing the front rails in an extended position and the vertical support means positioned for use.

FIG. 1 of the drawings illustrates an apparatus 1 for conveying a hearth insert from the hearth cavity to a position permitting maintenance of the hearth cavity. The apparatus 1 comprises a pair of rear rails 3 and 5 joined at proximal end 7 and distal end 9. The rear rails have disposed therein rear conveying means 11 illustrated here as rollers. Such conveying means, however, may be any conventional conveying means such as an endless belt or mounted bearings.

Disposed between rear rails 3 and 5 are front rails 13 and 15. Front rails 13 and 15 are mounted for telescoping from between rear rails 3 and 5 and are slidably received in slots in distal end connection 9 and center brace 17. Front rails 13 and 15 while being telescopingly mounted may be locked in a desirable position by individual locking means 19 and 21 illustrated in FIG. 1 as a clamp which may be bolted (not shown) to center brace 17. Front rails 13 and 15 support front conveying means 25 illustrated here also as rollers but which may be any conventional conveying means as discussed above. Front rails 13 and 15 preferably have a tapered distal end 27 to aid in positioning the front rails beneath an insert for the conveying thereof.

The distal end 9 of parallel rear rails 3 and 5 have extending therefrom support means 29 and 31 for resting upon an elevated surface. This may be best envisioned by referring to FIG. 2 of the drawings in which an apparatus in accordance with this invention is disposed upon an elevated hearth 33 with an insert 35 partially removed from hearth cavity. Support means 29 and 31 are of sufficient width to alleviate the force applied to the hearth. The apparatus 1 is disposed over a drop cloth 37 in order to prevent any debris from landing upon or soiling the hearth surroundings.

The apparatus additionally comprises adjustable vertical support means 39 and 41 attached to proximal end 7. The vertical support means 39 and 41 are adjusted in order to level rear rails 3 and 5 and are stabilized by reinforcements 40 and 42. Support means 39 and 41 are adjustable by means of wing nuts 43 and 45 in combination with an appropriate bolt which passes through proximal end connection 7. It is understood, however, that any suitable adjustable means may be utilized.

Figure 2:
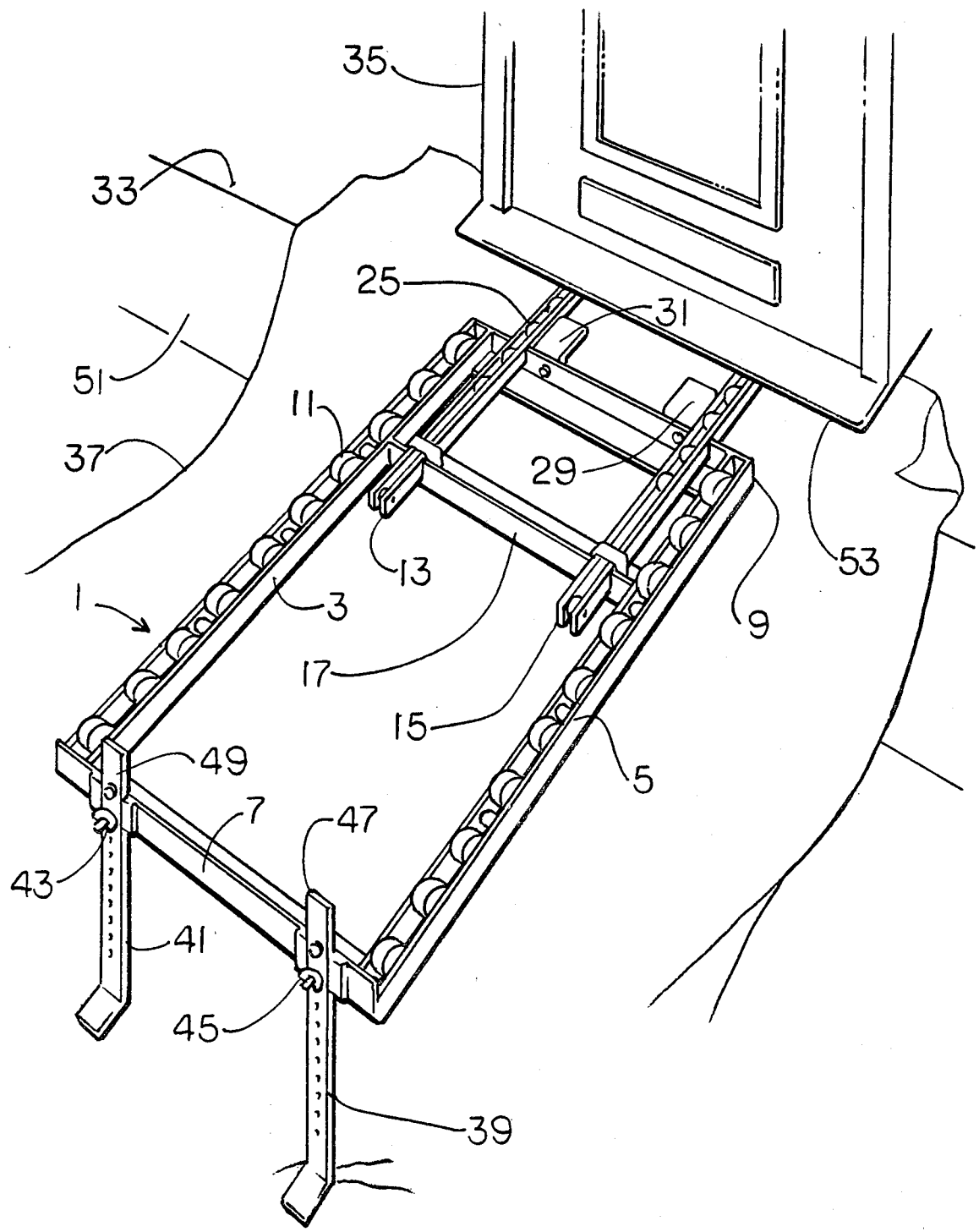
FIG. 2 of the drawings illustrates an isometric view of the apparatus in accordance with this invention in combination with a hearth insert being removed from a hearth cavity.

An advantageous feature of the construction illustrated in FIG. 2 of the drawings is that the upper portions 47 and 49 of adjustable vertical supports 39 and 41 act as backstops for preventing an article such as the insert 35 from rolling past and off of proximal end 7. Upper ends 47 and 49 thus become in effect backstops for the apparatus.

From the view illustrated in FIG. 2 of the drawings, it is readily apparent that an insert 35 may be readily removed from a hearth cavity and rolled along apparatus 1 to a desired position by a single individual. It is additionally apparent that the insert may be readily reinserted into a hearth cavity by the same individual without having to recenter the insert and without having the insert contact the outer hearth surface.

A preferred aspect of this invention is that front rails 13 and 15 and the conveying means 25 thereon are substantially thinner than rear rails 3 and 5 and the conveying means 11 mounted thereon. As is apparent from the FIG. 2 illustration, front rails 13 and 15 rest upon the hearth surface while rear rails 3 and 5 are suspended between support means 29 and 31 and adjustable vertical support means 39 and 41. It is thus necessary that the rear rails 3 and 5 have strength sufficient to support a load over the span represented by the distance between the proximal end 7 and distal end 9 of the rear rails. However, the rear conveying means 11 and front conveying means 25 are desirably and preferably coplanar in order to permit an easy transition of an insert 35 from the front rails 13 and 15 to the rear rails 3 and 5 concomitant with the strength required of rear rails 3 and 5 is the thinness required of front rails 13 and 15 in order to permit extension of the front rails and front conveying means into the limited space available beneath an insert. This advantageous feature will be more apparent from the following description of the process in accordance with this invention.

The process of utilizing the apparatus in accordance with this invention is carried out by positioning the apparatus in a close proximity to the insert with the support means 29 and 31 resting upon elevated surface 33. The adjustable vertical support means 39 and 41 are then adjusted in order to level the rear rails. Front rails 13 and 15 are then telescoped into a position immediately adjacent the insert while leaving a short distance, e.g., one inch, between the distal end 7 of rear rails 3 and 5 and the vertical surface 51 which abuts elevated surface 33. Front rails 13 and 15 are then locked into position with locking means 19 and 21. The lower surface 53 of insert 35 is then slightly elevated in order to permit front rails 13 and 15 to be inserted thereunder. This is preferably carried out by utilizing a crow bar to elevate the insert. Upon elevation of the insert, distal end 9 is moved into contact with vertical surface 51 preferably. Once front rails 13 and 15 are disposed beneath the insert 35 the entire insert may be easily moved across conveying means 11 and 25, and ultimately brought to rest against upper ends 47 and 49 of vertical support means 39 and 41.

It is thus seen that the apparatus of this invention may be easily utilized by a single individual to remove a hearth insert for purposes of maintenancing the hearth cavity. Such apparatus additionally permit the reinsertion of the insert without the need for recentering the insert. It is thus possible to replace the insert into its exact prior position. This greatly facilitates realignment of any screws or bolts which must be placed through the insert and into portions of the hearth.

Figure 3:
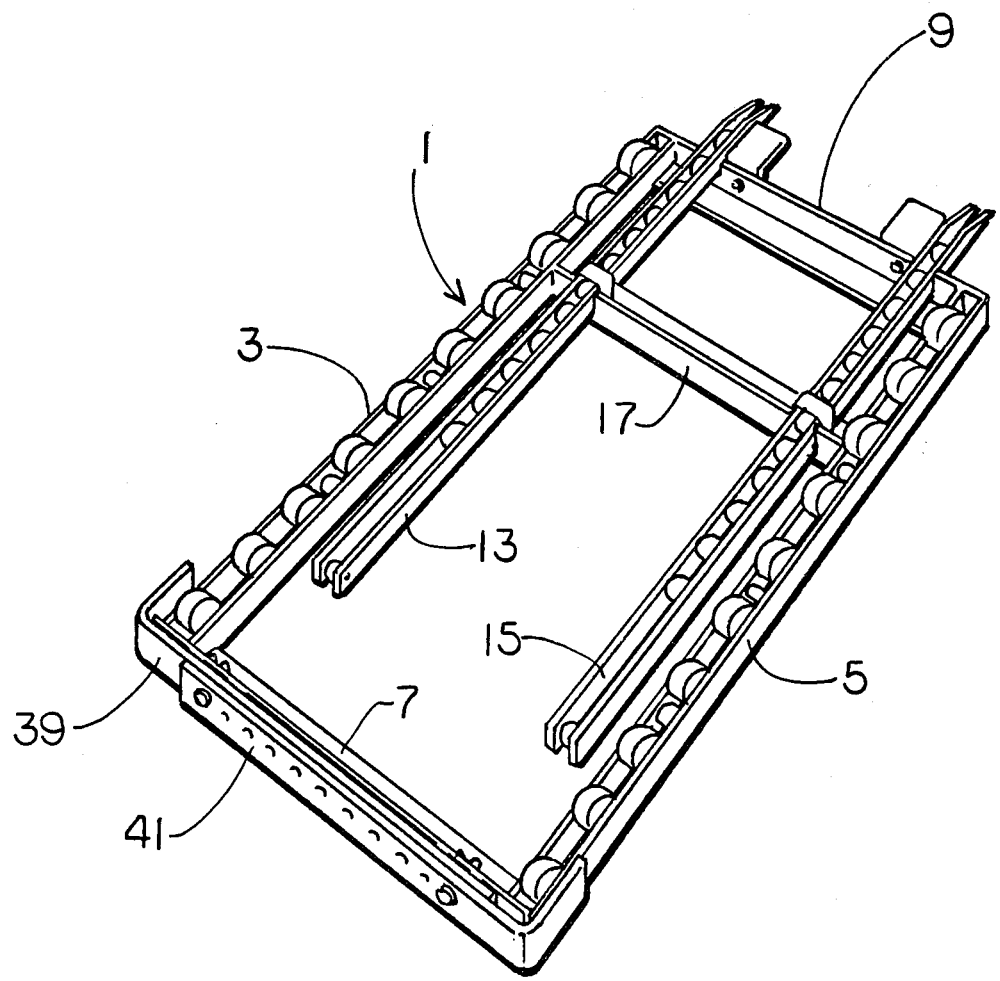
FIG. 3 of the drawings is an isometric view of an apparatus in accordance with this invention wherein the front rails are in a fully retracted position and the vertical support means are in a folded position for transport.

FIG. 3 of the drawings illustrates the apparatus 1 of this invention in the fully retracted state for transport and storage. It is seen that front rails 13 and 15 are fully telescoped between rear rails 3 and 5. Additionally vertical support means 39 and 41 may be bolted one atop the other in a very compact manner.

Various modifications or alternative embodiments exist with the apparatus of this invention. While conveying means 11 and 25 are illustrated as being rollers and preferably fabricated of nylon, it is understood that various other conventional conveying means may be utilized so long as the overall apparatus performs its basic function and remains portable by a single individual.

It is thus seen that the apparatus of this invention provides a novel apparatus to assist in the removal and reinsertion of a hearth insert. It is further seen that this invention provides a novel process, whereby a single individual may remove a hearth insert from a hearth cavity and reinsert same in an easy and effective manner. As many variations will be apparent to one of skill in the art from a reading of the above specification, such variations are within the spirit and scope of the subject invention as defined by the following appended claims.

That which is claimed is:

1. A process for removing a fireplace insert from a hearth cavity for the purpose of cleaning said cavity comprising the steps of:
    positioning an apparatus for moving a fireplace insert in proximity to said cavity, said apparatus comprising:
    a pair of parallel rear rails having a proximal end and a distal end;
    rear conveying means disposed within said rear rails;

a pair of front rails telescopingly disposed between said rear rails from extending from the distal end of said rear rails;

front conveying means disposed within said front rails;

support means for resting upon an elevated surface extending from the distal end of said rear rails;

adjustable vertical support means attached to the proximal end of said rear rails;

positioning said support means upon an elevated hearth adjacent said hearth cavity;

adjusting said vertical support means to level said rear rails;

telescoping said pair of front rails from between said rear rails into a position adjacent said insert;

elevating said insert a distance sufficient to permit said front rails to extend under said insert;

extending said front rails under said insert; and conveying said insert across said front conveying means and said rear conveying means to permit access to said hearth cavity.

2. The process according to claim 1 further comprising means for preventing a conveyed article from moving past said proximal end of said rear rails.

3. The process according to claim 2 wherein said adjustable vertical support means extend above and below the proximal end of said rear rails to both support said rear rails and to act as a back stop to prevent an object conveyed on said rear rails from moving past the proximal end of said rear rails.

4. The process according to claim 1 wherein said front rails telescope from between said rear rails and further including locking means for locking said front rails in a desired position.

5. The process according to claim 1 wherein said telescoping front rails terminate in a taper at their distal end.

6. The process according to claim 1 wherein said rear conveying means comprise rollers.

7. The process according to claim 1 wherein said front conveying means comprise rollers.

8. The process according to claim 1 wherein said front rails in combination with said front conveying means have a vertical height of less than the vertical height of said rear rails in combination with said rear conveying means.

9. The process according to claim 1 further comprising means for locking each of said front rails in a desired position.

* * * * *